United States Patent Office.

JAMES STEART, OF BERMONDSEY, COUNTY OF SURREY, ENGLAND.

IMPROVED METHOD OF EXTRACTING FIBER FROM CHINA GRASS, &c.

Specification forming part of Letters Patent No. 59,331, dated October 30, 1866.

*To all whom it may concern:*

Be it known that I, JAMES STEART, of Bermondsey, in the county of Surrey, England, manufacturer, have invented certain Improvements in Extracting the Fiber from China Grass, Flax, and other Analogous Vegetable Substances, which improvements are also applicable to preparing, cleaning, and purifying goats' hair, silk, wool, and other analogous substances; and that the following is a full, clear, and exact description of the principle or character which distinguishes it from all other things before known, and of the usual manner of making, modifying, and using the same.

My invention has for its object, first, to extract fiber from China grass, rhea or Siam grass, Spanish grass, flax, weed, and other analogous vegetable substances; and, secondly, to prepare, cleanse, and purify goats', camel, and other hair, silk, wool, and other analogous substances for manufacturing purposes.

My process is as follows: I submit the grass, plant, weed, or other analogous vegetable substance, or hair, wool, silk, or other analogous substance, to various degrees of pressure by means of rollers or beaters, for the purpose of bruising, loosening, or detaching the outer sheath or skin and the saccharine and extraneous matters; but this part of the process, though useful, is not indispensable, and need not necessarily be adopted, as it increases the labor required, and the grass, plant, weed, or hair, wool, silk, or other analogous substance may at once be placed in a wash-bath of cold water till it is cleansed from all external impurities. It is then removed and placed in a bath, known in tanning as the "pure," with or without water. The pure bath which I prefer is that obtained by digesting fish in a vessel exposed to the action of heat or steam. This pure bath may also be made from various animal substances or chemicals, as is well understood by persons conversant with the tanning of leather; but I prefer using the fish bath.

When the grass, plant, weed, hair, wool, silk, or other analogous substance has been exposed to the action of this bath for a sufficient length of time, the fiber from the grass, plant, weed, or other analogous vegetable substance will be set free, and it may then be detached by motion, washing, or friction, by means of suitable apparatus, and the hair, wool, silk, or other analogous substance is freed from all extraneous matters, and is thus prepared, cleaned, and purified. By this process the saccharine, gelatinous, or fleshy and extraneous parts of the grass, plant, weed, hair, wool, silk, or other analogous substance is decomposed and removed, leaving the fiber, hair, or other material in an uninjured state; and I find by experience that 200° to 212° of Fahrenheit is the most suitable and effective temperature for the treatment of the substances in the bath. The grass, plant, weed, or hair, wool, silk, or other analogous substance is then dried and fit for manufacturing purposes.

Having thus described the nature of my invention and the manner of performing the same, I wish it to be understood that what I claim is—

The obtaining the fiber from China grass, rhea or Siam grass, Spanish grass, weed, flax, and other analogous vegetable substances, and the preparing, cleaning, and purifying of goats', camel, and other hair, silk, wool, and other analogous substances, by subjecting the same to the process above described.

In testimony whereof I, the said JAMES STEART, have hereto set my hand this 11th day of May, in the year of our Lord 1866.

J. STEART.

Witnesses:
  G. F. REDFERN,
  C. BORIE.